United States Patent [19]

Bechteler et al.

[11] 4,248,502

[45] Feb. 3, 1981

[54] ELECTRO-OPTICAL LIQUID CRYSTAL DISPLAY DEVICE

[75] Inventors: Martin Bechteler, Kirchheim; Hans Krueger, Munich, both of Fed. Rep. of Germany

[73] Assignee: Siemens Aktiengesellschaft, Berlin & Munich, Fed. Rep. of Germany

[21] Appl. No.: 47,745

[22] Filed: Jun. 12, 1979

[30] Foreign Application Priority Data

Jun. 21, 1978 [DE] Fed. Rep. of Germany ....... 2827258

[51] Int. Cl.³ ................................................ G02F 1/13
[52] U.S. Cl. ..................... 350/341; 350/164; 350/339 R
[58] Field of Search ............... 350/341, 339 R, 164, 350/166

[56] References Cited

U.S. PATENT DOCUMENTS

| | | | |
|---|---|---|---|
| 3,834,792 | 9/1974 | Janning | 350/341 |
| 4,083,099 | 4/1978 | Yano et al. | 350/341 X |
| 4,150,877 | 4/1979 | Kobale et al. | 350/341 |

*Primary Examiner*—Edward S. Bauer
*Attorney, Agent, or Firm*—Hill, Van Santen, Steadman, Chiara & Simpson

[57] ABSTRACT

An electro-optical display device particularly a liquid crystal display device having a pair of carrier plates spaced apart to form a cavity with each of the carrier plates on a surface facing the cavity being provided with an electrically conductive layer covered by a dielectric layer with the device having the medium, which may be the liquid crystal layer and is switchable between two optically different states, disposed in the cavity, characterized by the conductive layer having a thickness $d_1$ and an index of refraction $n_1$ and each of the dielectric layers having a thickness $d_2$ and a refractive index $n_2$ with the thickness having a range of 0.5 $\bar{d}_1 \leq d_1 \leq 1.5 \bar{d}_1$ and 0.5 $\bar{d}_2 \leq d_2 \leq 1.5 \bar{d}_2$, wherein $$\bar{d}_1 = \frac{\lambda}{2 \pi n_1} \arctan \sqrt{\frac{A \cdot B}{C \cdot D}} \text{ , and}$$

$$\bar{d}_2 = \frac{\lambda}{2 \pi n_2} \arctan \sqrt{\frac{A \cdot D}{B \cdot C}} \text{ ,}$$

with $\lambda$ being the mean free wavelength of the operating light, $$A = 1 - \frac{n_0}{n_3}, B = \frac{n_0}{n_1} - \frac{n_1}{n_3},$$

$$C = \frac{n_1}{n_2} - \frac{n_0 \cdot n_2}{n_1 \cdot n_3}, D = \frac{n_2}{n_3} - \frac{n_0}{n_2}$$

with $n_o$ being the index of refraction of the carrier plate and $n_3$ being the index of refraction of the liquid crystal layer in the idle state.

12 Claims, 1 Drawing Figure

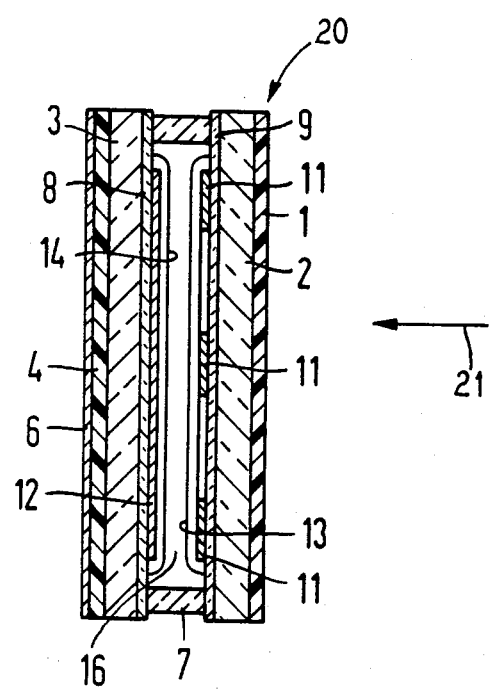

ELECTRO-OPTICAL LIQUID CRYSTAL DISPLAY DEVICE

BACKGROUND OF THE INVENTION

The present invention is directed to an electro-optical display device, particularly a liquid crystal display device, with a medium, which is switchable between optical different states, disposed between two carrier plates, which carrier plates on a surface facing the medium are provided with electrically conductive layers which are each covered by a dielectric layer.

Electro-optical displays utilizing a liquid crystal layer disposed in a cell formed by a pair of carrier plates having electrodes formed by transparent conductive coatings covered by dielectric coatings or layers are known in various types of embodiments. For example, German Offenlegungsschrift No. 2,458,883 and the corresponding British Patent Specification No. 1,481,719, which are both based on the same French priority document, disclose one type of display device.

As is well known, the light, which permeates the transparent layers, is partially reflected at the interface which have non-sequential layers in the index of refraction. Because of this, the electrode coatings of a display will also reflect the light, namely to such a degree that representation qualities would be significantly prejudiced without special dereflection or anti-reflection measures.

A conductive layer is then relatively low reflection when it has a thickness which corresponds to the half wavelength of the light in the conductive layer of material or when the thickness, which is measured with respect to the light wavelength, is relatively thin. The two dimensions have a series of specific disadvantages. $\lambda/2$ layers, which are, for example approximately 150 nm thick in an $In_2O_3$ electrode, must be exactly dimensioned, are often no longer significantly anti-reflective ("color cast") at specific light wavelengths, and generally lead to orientation disruptions in liquid crystal cells at their edges. The "thin" conductive layers, which generally have a thickness of at most 25 nm, have a relatively high resistance and always still exhibit clear preceptible residual reflections especially when applied by a chemical vapor deposition (CVD) process.

To overcome these difficulties, one suggestion has been the insertion or the use of reflection reducing additional layers (see German Auslegeschrift No. 2,313,730 and the corresponding British Patent Specification No. 1,428,700 based thereon as well as the previously mentioned German Offenlegungsschrift No. 2,458,883). These layers, which are usually located between the substrate and the electrode layer, have a thickness of $\lambda/4$ and according to the disclosure of the German Offenlegungsschrift No. 2,458,883, exhibit an index of refraction $$n = \sqrt{n_{substrate} \cdot n_{liquid\,crystal}}\,.$$

However, these layers do not provide completely satisfying results and the reflection factors will deviate significantly from one another between the area with the conductive layer and the area free of the conductive layer. The additional layers could be expanded to form "anti-reflection coatings" as disclosed in the U.S. Pat. No. 3,736,047 and the German Offenlegungsschrift No. 2,454,462. Many experts in the field, however, have arrived at the opinion that the anti-reflection or de-reflection coatings cannot justify the significant additional expense involved at least in a liquid crystal display (cf. in this regard M. Tobias, *International Handbook of Liquid Crystal Displays*, Ovum Press Limited, London, 1975, Section 8.6.5.1). Thus, praxis, one has the recourse to provide the electrodes with a more or less precisely defined thickness and accept the mirror effect.

SUMMARY OF THE INVENTION

The present invention is directed to producing electro-optical displays, whose conductive layers are completely anti-reflective and which nonetheless is relatively simple and cost favorable to produce and manufacture.

To accomplish these tasks, the present invention is directed to an improvement in an electro-optical display device having a pair of carrier plates spaced apart to form a cavity, each of said carrier plates on a surface facing the cavity being provided with an electrically conductive layer covered by a dielectric layer and said device having a medium switchable between two optically different states disposed in said cavity. The improvement comprises each of the conductive layers having a thickness $d_1$ and an index of refraction $n_1$ and each of the dielectric layers having a thickness $d_2$ and a refractive index of $n_2$, said thicknesses having a range of $0.5\,\bar{d}_1 \leq d_1 \leq 1.5\,\bar{d}_1$ and $0.5\,\bar{d}_2 \leq d_2 \leq 1.5\,\bar{d}_2$ wherein $$\bar{d}_1 = \frac{\lambda}{2\pi n_1} \cdot \arctan\sqrt{\frac{A \cdot B}{C \cdot D}} \,, \text{ and} \tag{1}$$

$$\bar{d}_2 = \frac{\lambda}{2\pi n_2} \cdot \arctan\sqrt{\frac{A \cdot D}{C \cdot B}} \tag{2}$$

wherein $\lambda$ = the mean free wavelength of the operating light, $$A = 1 - \frac{n_0}{n_3},\; B = \frac{n_0}{n_1} - \frac{n_1}{n_3},$$
$$C = \frac{n_1}{n_2} - \frac{n_0 \cdot n_2}{n_1 \cdot n_3},\; D = \frac{n_2}{n_3} - \frac{n_0}{n_2}$$

wherein $n_0$ = the index of refraction for the carrier plates and $n_3$ = the index of refraction of the medium in the idle state.

The equations 1 and 2 have been known per se for decades (in this regard, for example, see S. Flügge, *Handbuch der Physik*, "Grundlagen der Optik," Vol. 24, Springer-Verlag, Berlin, Göttingen, Heidelberg, 1956, pp. 490–494). However, these results have not been employed for the anti-reflection of electro-optical displays, in particular liquid crystal cells. Thus is due to the fact that their applicability in these devices has been doubted. These equations were originally derived for multiple layers consisting exclusively of non-conductors. Moreover, it had to seem doubtful whether coatings with a decided surface profile such as, for example rubbed or obliquely sputtered orientation layers of a liquid crystal cell could be in a position to compensate for reflection of another layer.

Surprisingly, it has turned out that in the inventive display the reflection at the three transition carrier surfaces, the carrier/conductive layer/coating/medium compensate each other in such a manner that these interfaces function completely de-reflective for a large range of light wavelengths. This is also true when one deviates from the ideal thicknesses $\bar{d}_1$ and $\bar{d}_2$. Experiments confirm that in the individual case, the actual value of $d_1$ and $d_2$ can vary up to ±50% of the ideal thicknesses without noticeable reflections or discoloration accuracy. This large variation in the dimension is particulatly valuable. On the one hand, the layer thickness no longer needs to be observed as strictly as, for example, in the λ/2 layer. On the other hand, one can depart from the optimum value $\bar{d}_1$ or, respectively, $\bar{d}_2$ in such a manner that the display surface is also de-reflective at the same time where the conductive layer is missing. As a further advantage, it must be stated that the electrodes, when given a suitable material section, can also be given thicknesses of far more than 25 nm and thereby the thickness ranges, which have very low surface resistance values are available. Finally, it is also desirable that although the layers which have the inventive dimensions are de-reflected with respect to the liquid crystal layer, they reflect with respect to air and, therefore, are readily visible upon assembly. Thus, one can easily align the two carrier plates with respect to one another without additional assistance as is otherwise required.

A display with the layers dimensioned in the proposed manner is still extremely low-reflection even when the carrier plates are provided with a further layer, for example a protective layer between the substrate and the conductive layer as disclosed in German Auslegeschrift No. 2,313,730. This additional layer, however, should have an identical or very similar index of refraction as the carrier plate. Otherwise, the equation system would have to be correspondingly expanded.

As mentioned hereinabove, the thicknesses $d_1$ for the electrodes or conductive layers and $d_2$ for the dielectric layer may vary from the ideal thicknesses of $\bar{d}_1$ and $\bar{d}_2$ by as much as 50%. However, the ranges are preferably $0.6\,\bar{d}_1 \leq d_1 \leq 1.4\,\bar{d}_1$ and $0.6\,\bar{d}_2 \leq d_2 \leq 1.4\,\bar{d}_2$. In particular, the range can be even narrowed further to $0.7\,\bar{d}_1 \leq d_1 \leq 1.3\,\bar{d}_1$ and $0.7\,\bar{d}_2 \leq d_2 \leq 1.3\,\bar{d}_2$ with the most advantageous range being $0.85\,\bar{d}_1 \leq d_1 \leq 1.15\,\bar{d}_1$ and $0.85\,\bar{d}_2 \leq d_2 \leq 1.15\,\bar{d}_2$.

The dielectric layers in accordance with the present invention preferably serve as the orientation layers and have means for orienting the liquid crystal layer. These means may be elevations and depressions, which exhibit channels that extend parallel to one another. Each of the layers may be formed by being vacuum deposited obliquely to the carrier plate.

BRIEF DESCRIPTION OF THE DRAWING

The FIGURE is a cross section with portions in elevation for purposes of illustration of an optical display device in accordance with the present invention.

DESCRIPTION OF THE PREFERRED EMBODIMENT

The principles of the present invention are particularly useful in an optical display device generally indicated at 20. The optical display device 20 is illustrated as a seven segment liquid crystal display, which operates in accordance with the principles of a so-called twisted cell.

The display device 20, when viewed from the direction of observation indicated by arrow 21, has a front linear polarizer 1 disposed on a front surface of a front carrier plate 2, a back carrier plate 3 having a back linear polarizer 4 disposed on the back surface with the direction of polarization of the polarizer 4 being perpendicular to the direction of polarization for the polarizer 1 and a reflector 6 disposed on the back surface of the linear polarizer 4. The two carrier plates 2 and 3 are tightly connected together in a sealed relation by a frame 7 to form a cavity 16. The front carrier plate 2 has a protective layer 9 and the back carrier plate 3 has a protective layer 8 with both layers 8 and 9 being on surfaces that face the cavity 16. Disposed on the protective layers 9 of the front plate 2 is a segmented electrode formed by segmented conductive layers or coating 11 and a continuous electrode formed by a continuous conductive coating 12 is disposed on the protective layer 8 of the back carrier plate 3. Each of the conductive coatings is covered by an obliquely vacuum deposited orientation with a dielectric layer 13 covering the front electrodes 11 and dielectric layer 14 on the back electrode 12. The chamber 16, which is defined by the two substrates and the frame is filled with a liquid crystal material. Operation of the device 20 is generally known, for example as disclosed in German Auslegeschrift No. 2,158,562 and the corresponding British Patent Specification 1,372,868 both of which are based on the same foreign application.

In the present example, the two carrier plates 2 and 3 consist of glass with an index of refraction of 1.48. The liquid crystal layer is a mixture which is well known and is marketed by the firm Hoffmann-La Roche under the designation ROTN 200. This liquid crystal mixture has an index of refraction of 1.78 while in the idle state in a direction normal to the plate. A material of $SiO_2$ base whose index of refraction corresponds to that of the glass plates, is selected for the protective layers 8 and 9 and is applied to the respective carrier plates by an immersion process. The conductive layers 11 and 12 essentially contain $In_2O_3$ which has an index of refraction $n_1 = 1.9$ and these conductive layers are applied preferably by a chemical vapor deposition (CVD) technique. The orientation layers are obliquely vacuum deposited and consist of a pure $SiO_2$ having an index of refraction $n_2 = 1.46$ in the direction of the plate normal. Given these index of refractions and performing the calculations for a wavelength λ = 550 nm, the equations 1 and 2 supply an ideal thickness $\bar{d}_1$ for the conductive layer of 25.4 nm and an ideal thickness $\bar{d}_2$ for the orientation layers 13 and 14 of 23.5 nm.

In Table 1, $\bar{d}_1$ and $\bar{d}_2$, which are determined by equations 1 and 2 are listed for a few examples. In these examples, $n_0$, $n_1$, $n_3$ are fixed with $n_0 = 1.48$, $n_1 = 1.9$, $n_3 = 1.78$ and the parameters $n_2$ and λ are varied.

TABLE I

| $n_2$ | $\bar{d}_1$ [nm] λ = 500nm | $\bar{d}_2$ [nm] λ = 500nm | $\bar{d}_1$ [nm] λ = 550nm | $\bar{d}_2$ [nm] λ = 550nm | $\bar{d}_1$ [nm] λ = 600nm | $\bar{d}_2$ [nm] λ = 600nm |
|---|---|---|---|---|---|---|
| 1.34 | 16.2 | 27.4 | 17.8 | 30.1 | 19.5 | 32.9 |
| 1.38 | 18.1 | 25.5 | 19.9 | 28.1 | 21.7 | 30.6 |
| 1.42 | 20.3 | 23.5 | 22.3 | 25.9 | 24.4 | 28.2 |
| 1.46 | 23.1 | 21.4 | 25.4 | 23.5 | 27.7 | 25.6 |
| 1.50 | 26.8 | 18.9 | 29.5 | 20.7 | 32.1 | 22.6 |

TABLE I-continued

| $n_2$ | $\bar{d}_1$ [nm] $\lambda = 500$nm | $\bar{d}_2$ [nm] $\lambda = 500$nm | $\bar{d}_1$ [nm] $\lambda = 550$nm | $\bar{d}_2$ [nm] $\lambda = 550$nm | $\bar{d}_1$ [nm] $\lambda = 600$nm | $\bar{d}_2$ [nm] $\lambda = 600$nm |
|---|---|---|---|---|---|---|
| 1.54 | 31.9 | 15.8 | 35.0 | 17.4 | 38.2 | 19.0 |
| 1.58 | 39.7 | 11.7 | 43.7 | 12.9 | 47.6 | 14.1 |
| 1.62 | 58.3 | 3.2 | 64.1 | 3.6 | 69.9 | 3.9 |

One can derive from the values in the table that the wavelength only has a minimum influence on the calculated ideal thickness and that with an increasing $n_2$, the conductive layers become thicker and thicker but the coating or orientation layers on the other hand become thinner and thinner. Thicker electrodes are generally preferred because of their more homogeneous structure and their higher surface conductance. However, the dielectric coating forming the orientation layer should not fall below a certain minimum thickness. Thus, in an obliquely vapor deposited layer, it should be observed that given a sputtering angle of approximately 60° or, respectively, approximately 84°, the layer thickness of at least 10 nm delivers the best results. With obliquely vapor depositing angle of approximately 79°, the orientation layer should be at least 15 nm thick.

In Table 2, a number of dielectric materials which are suitable as coatings are listed together with their index of refraction for visible light.

TABLE II

| Coating Material | $n_2$ |
|---|---|
| $Al_2O_3$ | 1.63 |
| $SiO_x$ ($1 \leq x \leq 2$) | 1.46-1.90 |
| $SiO_2$ | 1.46 |
| $SnO_2$ | 2.1 |
| $TiO_y$ ($y \approx 2$) | 2.4-2.6 |
| MgO | 1.7 |
| $ZrO_2$ | 2.05 |
| $MgF_2$ | 1.38 |
| ZnS | 2.3 |

With the assistance of these and similar tables, one can also determine the de-reflection conditions when specific marginal values such as, for example, a minimum conductivity of the conductive layers or a minimum thickness for the orientation layers are required.

It should be pointed out that when utilizing obliquely vapor deposited layers, the optical thickness is anisotropic and the actual thickness of the layer will fluctuate from location to location. Accordingly, the index of refraction value, which is introduced in equations 1 and 2, is the value exhibited by the layer with respect to a perpendicular striking beam of light of a specific polarization direction. Thus, the magnitude of $\bar{d}_2$, which is obtained from equation 2, is to be considered as a mean value.

The invention is not limited to the sample embodiments illustrated. Thus, in addition to a twisted cell, liquid crystal displays which are based on other display principles and/or have a different interface orientation can also utilize the principles of the present invention. Therefore, it makes no difference which texture the liquid crystal layer has or which angle of incidence the liquid crystal molecules assume with respect to the substrate plane. Apart from that, the proposed solution can also be successfully employed in displayed devices, which include passive as well as active displays and which function differently, for example, gas discharge panels or light valves with switchable suspensions are also conceivable. Independent of the underlying type of display, it is also within the ability of the expert to further improve the display contrast by means of additional measures. Among these possible additional measures in a liquid crystal display with obliquely vapor deposited orientation layer, for example, is an optimized positioning of the polarizer axes with respect to the orientation direction of the obliquely vapor deposited layer and the liquid crystal layer as discussed in *Journal of Applied Physics*, Vol. 48, 1977, p. 1426.

Although various minor modifications may be suggested by those versed within the art, it should be understood that we wish to embody within the scope of the patent granted hereon, all such modifications as reasonably and properly come within the scope of our contribution to the art.

We claim:

1. In an electro-optical display device having a pair of carrier plates spaced apart to form a cavity, each of said carrier plates on a surface facing the cavity being provided with an electrically conductive layer covered by a dielectric layer and said device having a medium switchable between two optically different states disposed in said cavity, the improvement comprising each of the conductive layers having a thickness $d_1$ and an index of refraction $n_1$ and each of the dielectric layers having a thickness $d_2$ and a refractive index of $n_2$, said thicknesses having a range of $0.5\,\bar{d}_1 \leq d_1 \leq 1.5\,\bar{d}_1$ and $0.5\,\bar{d}_2 \leq d_2 \leq 1.5\,\bar{d}_2$ wherein $$\bar{d}_1 = \frac{\lambda}{2\pi n_1} \cdot \arctan\sqrt{\frac{A \cdot B}{C \cdot D}}, \text{ and}$$

$$\bar{d}_2 = \frac{\lambda}{2\pi n_2} \cdot \arctan\sqrt{\frac{A \cdot D}{C \cdot B}}$$

wherein $\lambda =$ the mean free wavelength of the operating light, $$A = 1 - \frac{n_0}{n_3},\ B = \frac{n_0}{n_1} - \frac{n_1}{n_3},$$
$$C = \frac{n_1}{n_2} - \frac{n_0 \cdot n_2}{n_1 \cdot n_3},\ D = \frac{n_2}{n_3} - \frac{n_0}{n_2}$$

wherein $n_0 =$ the index of refraction for the carrier plates and $n_3$ is the index of refraction of the medium in the idle state.

2. In a display device according to claim 1, wherein the range of the thicknesses $d_1$ and $d_2$ are according to $$0.6\,\bar{d}_1 \leq d_1 \leq 1.4\,\bar{d}_1$$

and $$0.6\,\bar{d}_2 \leq d_2 \leq 1.4\,\bar{d}_2.$$

3. In a display device according to claim 1, wherein the thickness $d_1$ and $d_2$ have a range of $$0.7\,\bar{d}_1 \leq d_1 \leq 1.3\,\bar{d}_1$$

and $$0.7\bar{d}_2 \leq d_2 \leq 1.3 \bar{d}_2.$$

4. In a display device according to claim 1, wherein the thickness $d_1$ and $d_2$ have a range according to $$0.85 \bar{d}_1 \leq d_1 \leq 1.15 \bar{d}_1$$

and $$0.85 \bar{d}_2 \leq d_2 \leq 1.15 \bar{d}_2.$$

5. In a display device according to claim 1, wherein the medium is a liquid crystal layer, and wherein the dielectric layer includes means for orientation of the liquid crystal layer.

6. In a display device according to claim 5, wherein said means for orienting the liquid crystal layer comprises a surface of each of said dielectric layers facing the liquid crystal layer having a plurality of elevations and depressions.

7. In a display device according to claim 6, wherein the elevations and depressions in the dielectric layers form channels extending parallel to one another.

8. In a display device according to claim 7, wherein each of the carrier plates has an index of refraction $n_0 = 1.48 \pm 0.04$, said liquid crystal layer has an index of refraction $n_3 = 1.78 \pm 0.05$, each of the conductive layers consist of $In_2O_3$ with an index of refraction $n_1 = 1.9$ and a thickness $d_1 = 50 \pm 5$ nm and each of the dielectric layers consist of an organic material with an index of refraction $n_2 = 1.6 \pm 0.04$ and a thickness $d_2$ of $9,6 \pm 1$ nm.

9. In a display device according to claim 6, wherein each of the dielectric layers is a vacuum deposited oblique layer.

10. In a display device according to claim 9, wherein each of the carrier plates has an index of refraction $n_0 = 1.48 \pm 0.4$, said liquid crystal layer having an index of refraction $n_3 = 1.78 \pm 0.05$, each of the conductive layers consist of $In_2O_3$ with an index of refraction of $n_1 = 1.9$ and a thickness $d_1 = 25.4 \pm 3$ nm, and each of the dielectric layers consist essentially of $SiO_2$ with an index of refraction $n_2 = 1.46$ and a thickness $d_2 = 23.5 \pm 3$ nm.

11. In a display device according to claim 1, wherein each of the carrier plates has an additional layer, said additional layer being disposed on the surface of the carrier plate beneath the conductive layer and having an index of refraction approximately equal to the index of refraction $n_0$ of the carrier plate.

12. In a display device according to claim 11, wherein the additional layer is an immersion layer provided by an immersion process directly on the surface of the carrier plate.

* * * * *